US008429375B1

(12) United States Patent
Pollack et al.

(10) Patent No.: US 8,429,375 B1
(45) Date of Patent: Apr. 23, 2013

(54) MEMORY MANAGEMENT UNIT (MMU) TO MAKE ONLY ONE TIME PROGRAMMABLE (OTP) MEMORY APPEAR MULTIPLE TIMES PROGRAMMABLE (MTP)

(75) Inventors: Seth Pollack, Seattle, WA (US); Chad A. Lindhorst, Seattle, WA (US)

(73) Assignee: Synopsys, Inc., Mountain View, CA (US)

(*) Notice: Subject to any disclaimer, the term of this patent is extended or adjusted under 35 U.S.C. 154(b) by 160 days.

(21) Appl. No.: 11/818,757

(22) Filed: Jun. 15, 2007

Related U.S. Application Data

(60) Provisional application No. 60/814,642, filed on Jun. 16, 2006.

(51) Int. Cl.
*G06F 13/00* (2006.01)

(52) U.S. Cl.
USPC .................................. 711/202; 711/E12.002

(58) Field of Classification Search .............. 711/8, 103, 711/106, 154, 206, 207; 714/812, 6; 365/96, 365/195
See application file for complete search history.

(56) References Cited

U.S. PATENT DOCUMENTS

| | | | | |
|---|---|---|---|---|
| 6,697,928 | B2 * | 2/2004 | March et al. | 711/171 |
| 6,836,834 | B2 * | 12/2004 | Schulze et al. | 711/200 |
| 6,895,490 | B1 * | 5/2005 | Moore et al. | 711/203 |
| 6,957,295 | B1 * | 10/2005 | Estakhri | 711/103 |
| 2004/0098428 | A1 * | 5/2004 | Schulze et al. | 707/205 |
| 2004/0128430 | A1 * | 7/2004 | Rudelic | 711/102 |
| 2005/0249008 | A1 * | 11/2005 | Hsieh | 365/210 |
| 2006/0047920 | A1 * | 3/2006 | Moore et al. | 711/154 |
| 2006/0059203 | A1 * | 3/2006 | Yamanaka | 707/104.1 |
| 2007/0053250 | A1 * | 3/2007 | Wu | 369/30.86 |
| 2007/0130441 | A1 * | 6/2007 | Wooten | 711/203 |
| 2008/0023790 | A1 * | 1/2008 | Scheuerlein | 257/530 |

OTHER PUBLICATIONS

United States Office Action, U.S. Appl. No. 12/006,321, Mar. 17, 2001, 30 pages.
United States Office Action, U.S. Appl. No. 12/006,321, Oct. 19, 2011, 30 pages.
United States Office Action, U.S. Appl. No. 12/006,321, Oct. 25, 2010, 25 pages.
United States Office Action, U.S. Appl. No. 12/006,321, Apr. 6, 2010, 25 pages.
United States Office Action, U.S. Appl. No. 12/006,321, Dec. 23, 2009, 24 pages.
United States Office Action, U.S. Appl. No. 12/006,321, Jul. 21, 2009, 23 pages.
United States Office Action, U.S. Appl. No. 12/006,321, Apr. 20, 2012, 20 pages.

* cited by examiner

*Primary Examiner* — Pierre-Michel Bataille
*Assistant Examiner* — Sean D Rossiter
(74) *Attorney, Agent, or Firm* — Fenwick & West LLP

(57) ABSTRACT

Memory management units (MMUs) are disclosed. In one aspect, an MMU may have a first interface to a component. The first interface may receive one of a read of updated data from, and a write of updated data to, a virtual memory address. The virtual memory address may initially correspond to a first physical memory location in an only one time programmable (OTP) non-volatile memory (NVM). The MMU may have a remapping unit to remap a correspondence of the virtual memory address from the first physical memory location to a spare physical memory location. The MMU may also have a second interface to the OTP NVM. The second interface may allow the updated data to be read from or written to the spare physical memory location of the OTP NVM. Methods performed by the MMUs, and methods and articles useful for manufacturing MMUs, are also disclosed.

28 Claims, 16 Drawing Sheets

MEMORY MANAGEMENT UNIT (MMU) TO MAKE ONLY ONE TIME PROGRAMMABLE (OTP) MEMORY APPEAR MULTIPLE TIMES PROGRAMMABLE (MTP)

CROSS-REFERENCE TO OTHER APPLICATION

This application is a parent to divisional U.S. patent application Ser. No. 12/006,321.

RELATED APPLICATIONS

This patent application claims priority to U.S. Provisional Patent Application Ser. No. 60/814,642, entitled "OTP NVM Memory Management Unit (MMU) To Render Few TP", filed on Jun. 16, 2006.

BACKGROUND

1. Field

Embodiments of the invention relate to memories. In particular, embodiments of the invention relate to management of only one time programmable (OTP) memories to make them appear multiple times programmable (MTP).

2. Background Information

FIG. 1 is a block diagram of a prior art device having only one time programmable (OTP) non-volatile memory (NVM) cells 106. The device includes a circuit 101 and a NVM 104. By way of example, the circuit and NVM may be disposed on a wafer, die, or other integrated circuit. The NVM has the OTP NVM cells 106. In the illustrated example, the NVM memory has eight cells labeled OTP1 through OTP8, although fewer or more may optionally be used. The OTP NVM cells are respectively electrically coupled with sockets or another interface 102 of the circuit through lines or other conductive paths 105. The circuit may store or program data into each of the OTP NVM cells. The circuit may also read the data from each of the OTP NVM cells.

One potential advantage of the OTP NVM cells is that they may generally be made relatively small. However, the OTP NVM cells are not re-programmable. In other words, only one set of data may be stored in an OTP NVM cell.

FIG. 2 is a block diagram of a prior art device having multiple time programmable (MTP) non-volatile memory (NVM) cells 208. As before, the device includes a circuit 201 and a NVM 204. The NVM has the MTP NVM cells 208. In the illustrated example, the NVM memory has two MTP NVM cells labeled MTP1 and MTP2, although fewer or more may optionally be used. The MTP NVM cells are respectively electrically coupled with an interface 202 of the circuit through conductive paths 205. The circuit may program data into each of the MTP NVM cells, and may read the data from each of the MTP NVM cells.

One potential advantage of the MTP NVM cells is that they are re-programmable. They could even each be reprogrammed thousands of times or more. In other words, data may be stored over data previously stored in the MTP NVM cells. However, one potential disadvantage of the MTP NVM cells is that they generally tend to be significantly larger than the OTP NVM cells of FIG. 1. By way of example, they could even be around an order of magnitude larger. This added size tends to be undesirable for certain small miniature electronic devices, and in certain other situations. In addition, the larger size of the MTP cells relative to the OTP cells may also provide an attendant increase in manufacturing cost.

In certain applications, it may be desirable to provide a NVM that is smaller than that which would be possible using MTP NVM cells. Likewise, in certain applications, it may be desirable to provide a certain amount of re-programmability, although it is not always necessary for all of the cells to be capable of being re-programmed almost indefinitely (e.g., many thousands of times each). In other words, in certain implementations, it may be desirable to provide a level of re-programmability at a level that is somewhere between OTP and fully MTP, in exchange for a reduction in the size of the NVM from what would be possible using MTP NVM cells.

FIGS. 3A-3B are block diagrams illustrating a prior art approach for providing the appearance of re-programmability in a device having only one time programmable (OTP) non-volatile memory (NVM) cells. FIGS. 3A-3B show a device including a circuit 301 and a NVM 304. The NVM has OTP NVM cells 306. In the illustrated example, the NVM memory has eight cells labeled OTP1 through OTP8, although fewer or more may optionally be used. The OTP NVM cells are divided into fully redundant and/or duplicative banks. In particular, OTP1 through OTP4 are in a first bank. OTP5 through OTP8 are in a second bank.

As shown in FIG. 3A, the device has a set of initially programmed OTP NVM cells (the first bank of OTP1 through OTP4) and a fully redundant and/or duplicative un-programmed set of OTP NVM cells (the second bank of OTP5 through OTP8). As shown in FIG. 3B, to provide the appearance of re-programmability the entire set of initially programmed OTP NVM cells (the first bank of OTP1 through OTP4) are swapped out in favor of programming the initially un-programmed fully redundant and/or duplicative set of OTP NVM cells (the second bank of OTP5 through OTP8). By way of example, a shot counter may be used to select either the first or second bank. Lines 305 coupling the cells with the interface 302 of the circuit may be swapped.

This approach takes advantage of the relatively small size of the OTP NVM cells. However, using this approach, to reprogram the data in even one OTP NVM, all of the OTP NVM cells in an entire bank will be reprogrammed. The illustration shows only two-times re-programmability. However, to achieve N-times re-programmability, N-times the number of OTP NVM banks will be provided, where N is an integer greater than 1. As the number N increases, this tends to increase the size of the NVM significantly.

Additionally, in various different applications, only a portion of the data in the cells of a memory bank may change. As a result, swapping out an entire memory bank to replace only the data in the portion of the cells uses an unnecessarily large amount of memory.

BRIEF DESCRIPTION OF THE SEVERAL VIEWS OF THE DRAWINGS

The invention may best be understood by referring to the following description and accompanying drawings that are used to illustrate embodiments of the invention. In the drawings.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description.

Figure 1:
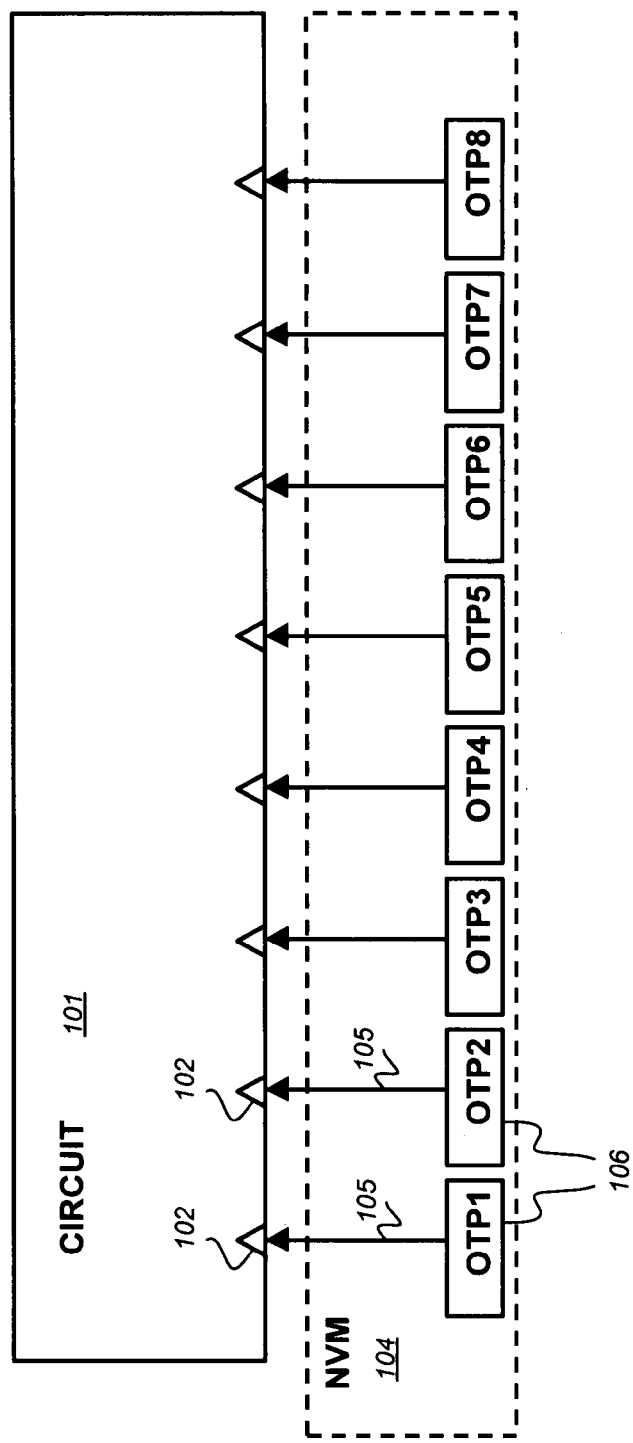
FIG. 1 is a block diagram of a prior art device having only one time programmable (OTP) non-volatile memory (NVM) cells. The OTP NVM cells are relatively small. However, the OTP NVM cells are not reprogrammable.
Figure 2:
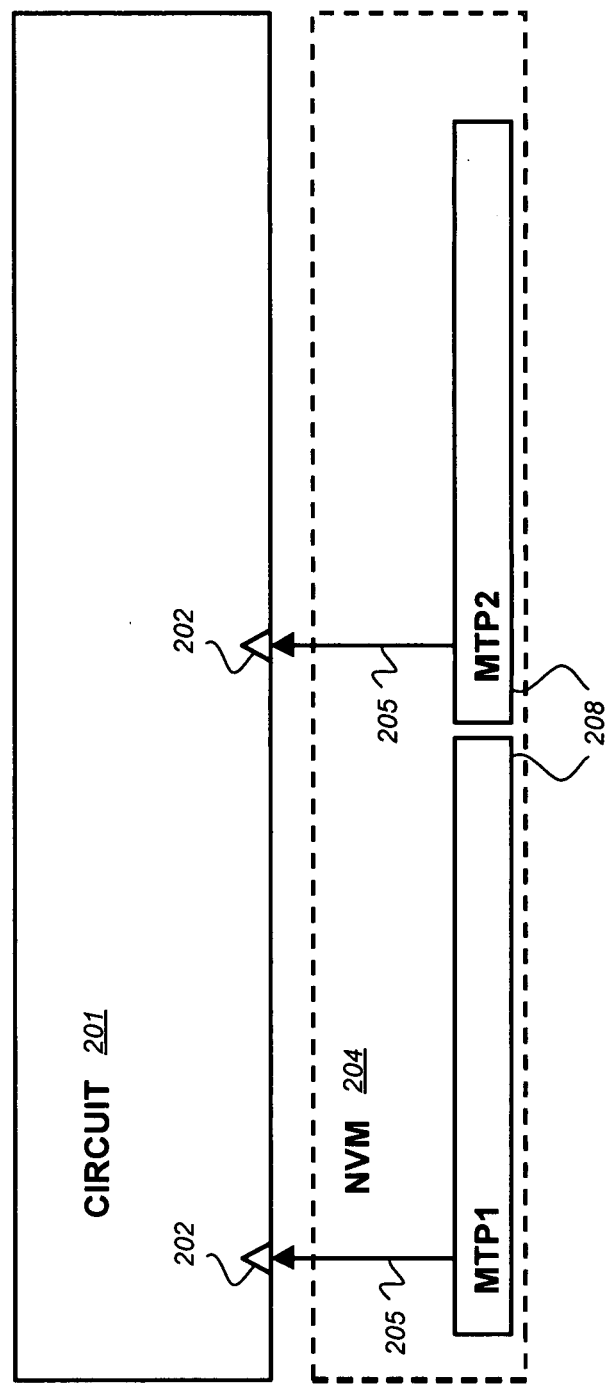
FIG. 2 is a block diagram of a prior art device having multiple time programmable (MTP) non-volatile memory (NVM) cells. The MTP NVM cells are reprogrammable. However, the MTP NVM cells are relatively large.
Figure 3A:
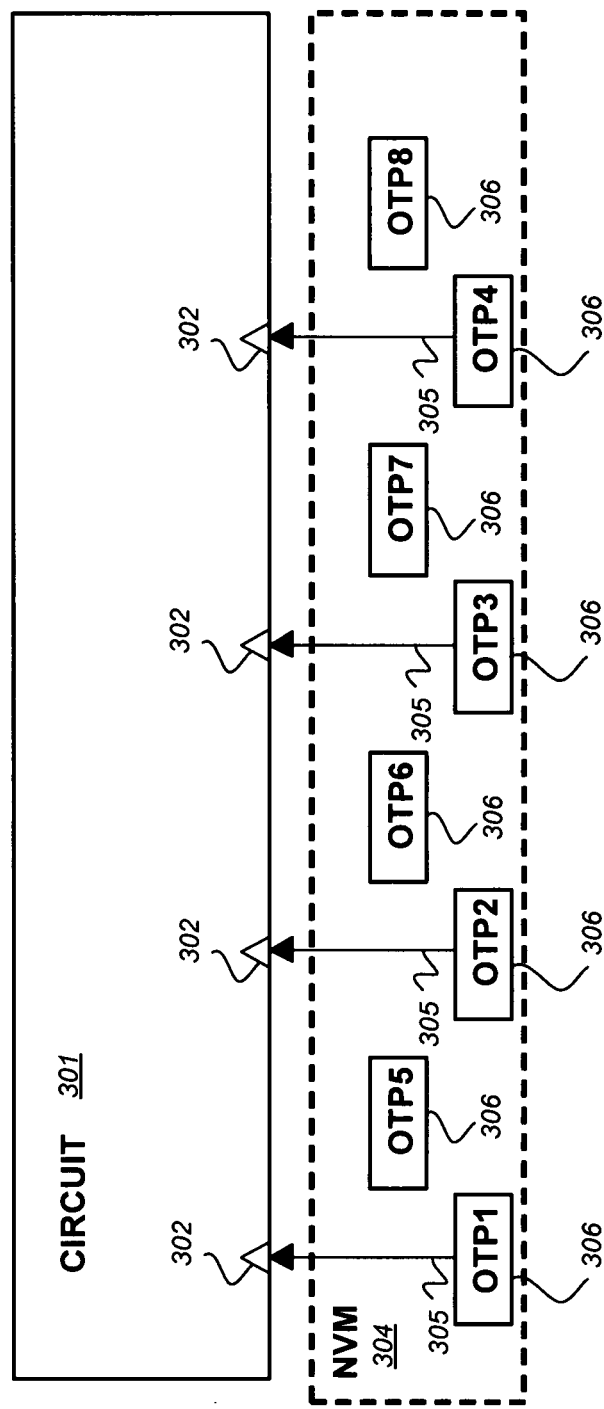
FIGS. 3A-3B are block diagrams illustrating a prior art approach for providing the appearance of re-programmability in a device having only one time programmable (OTP) non-volatile memory (NVM) cells. To provide the appearance of re-programmability an entire bank of initially programmed OTP NVM cells are swapped out in favor of programming an initially un-programmed fully duplicative and/or redundant bank of OTP NVM cells.
Figure 3B:
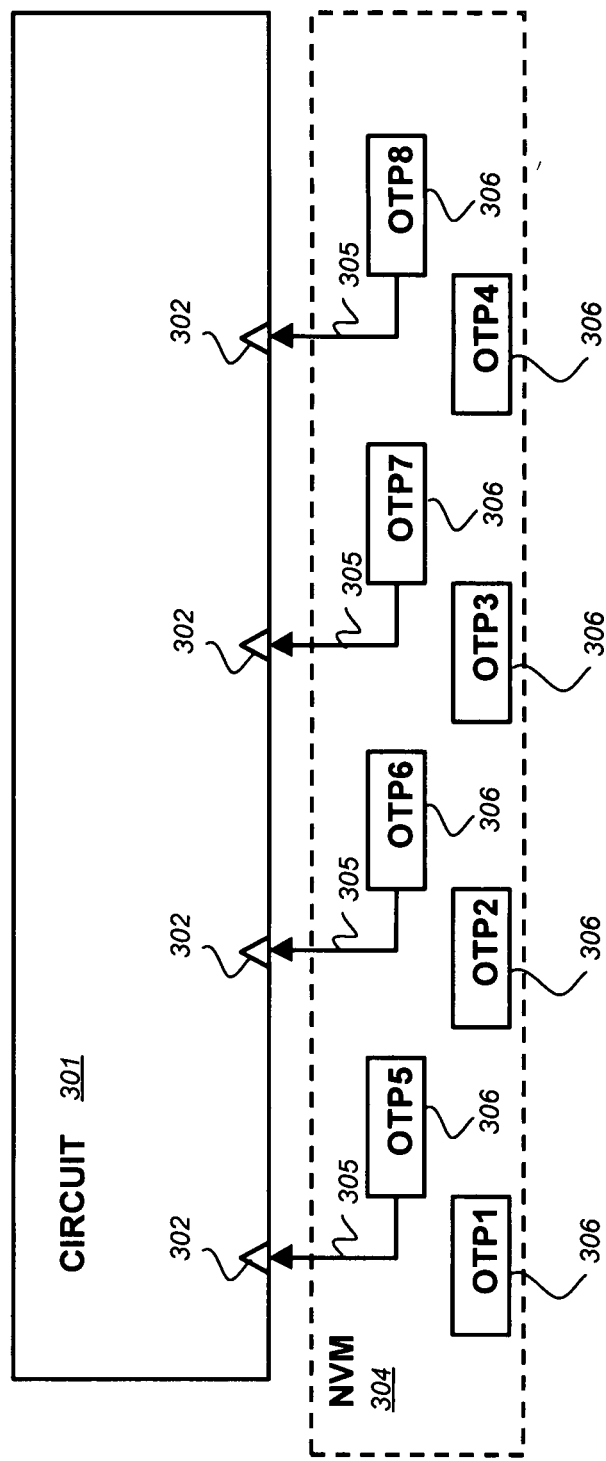
Figure 4:
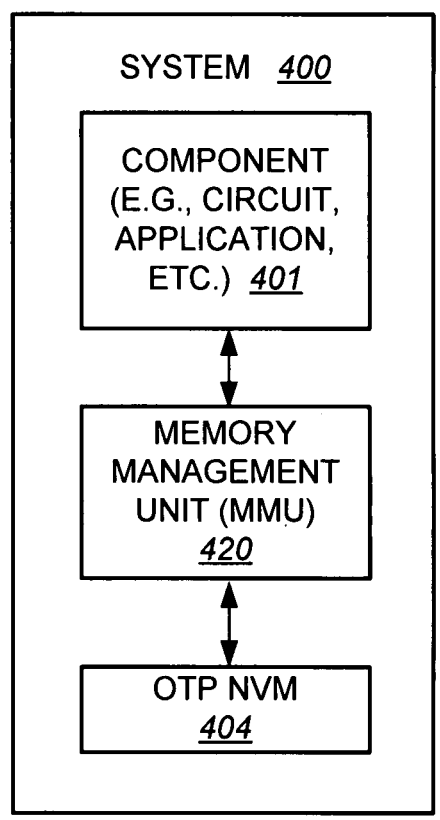
FIG. 4 is a block diagram of a system including a component (e.g., a circuit or application), an only one time programmable (OTP) non-volatile memory (NVM), and a memory management unit (MMU) functionally disposed between the component and the OTP NVM to manage the OTP NVM to provide the appearance of re-programmability to the component, according to embodiments of the invention.

FIG. 4 is a block diagram of a system 400 including a component 401 (e.g., a circuit or application), an only one time programmable (OTP) non-volatile memory (NVM) 404, and a memory management unit (MMU) 420 functionally disposed between the component and the OTP NVM to manage the OTP NVM to provide the appearance of re-programmability to the component, according to embodiments of the invention.

In embodiments of the invention, the system may be relatively small, for example, to benefit from the relatively small size of the OTP NVM. Examples of suitable relatively small systems include, but are not limited to, small portable handheld electronic devices (e.g., cell phones, PDAs, digital audio players, and digital cameras), and wireless communications devices (e.g., cellular phones, cordless phones, pagers, and PDAs). Other examples of suitable relatively small systems include, but are not limited to, radiofrequency identification (RFID) tags and other RFID devices. Still other examples of suitable relatively small systems include, but are not limited to, small portable memory devices (e.g., memory cards and Universal Serial Bus (USB) Flash drives).

However, it is not required that the system be small. Other examples of suitable systems, regardless of their size, include, but are not limited to, computer systems (e.g., servers, laptops, and desktops), and computer system peripherals (e.g., printers, scanners, and monitors). Further examples of suitable systems include, but are not limited to, entertainment devices (e.g., televisions, set-top boxes, DVD players, video recorders, stereos, and radios). These are just a few illustrative examples.

Figure 5:
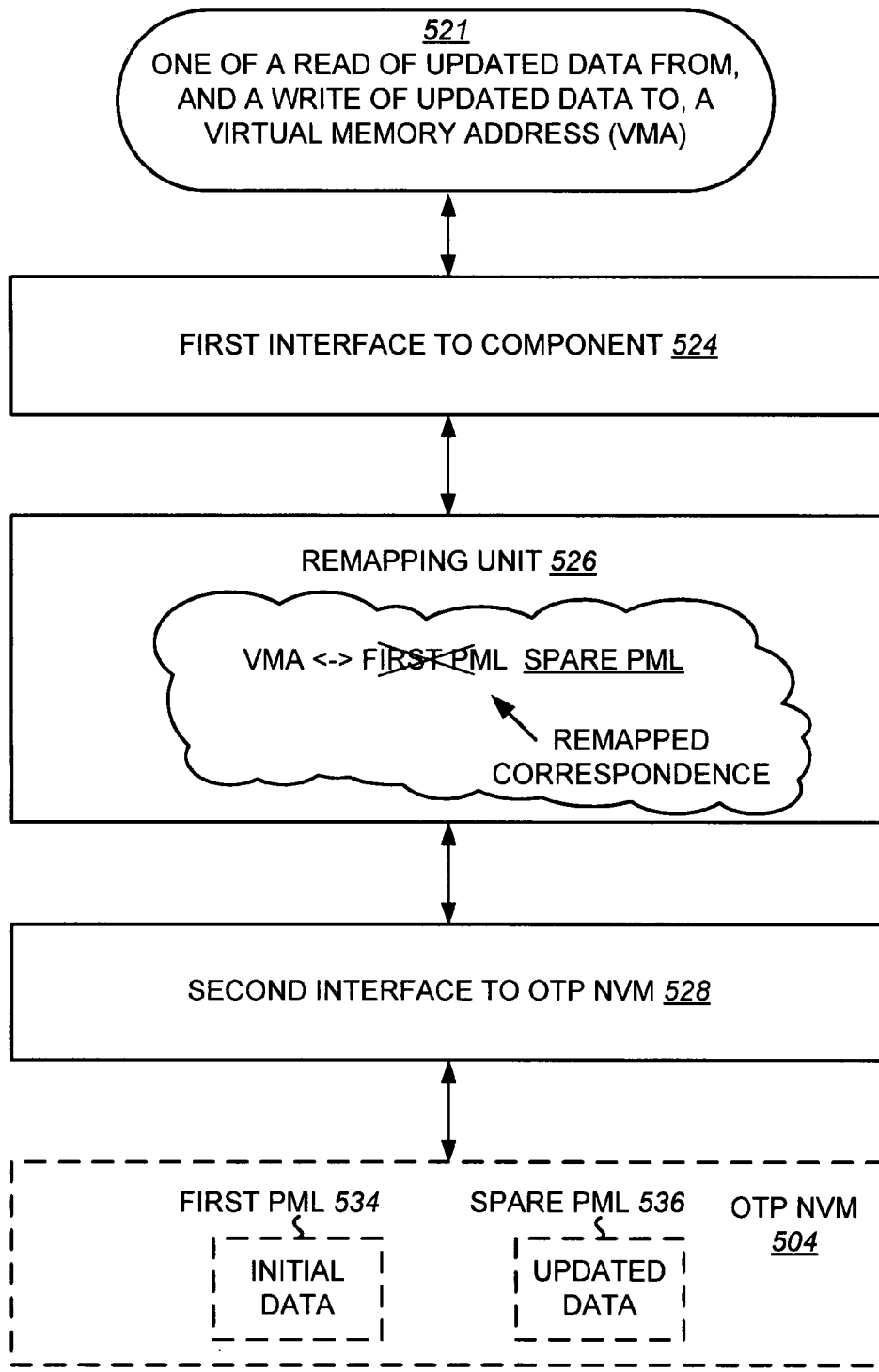
FIG. 5 is a block diagram of a memory management unit (MMU), according to embodiments of the invention.

FIG. 5 is a block diagram of an example of a memory management unit (MMU) 520, according to embodiments of the invention. The MMU has a first interface 524 to a component, such as, for example, a circuit or application. As shown at comment 521, the first interface may receive one of a read of updated data from, and a write of updated data to, a virtual memory address (VMA). The virtual memory address may initially correspond to a first physical memory location (first PML) 534 in an only one time programmable (OTP) non-volatile memory (NVM) 504.

The MMU also has a remapping unit 526. The remapping unit may remap a correspondence of the virtual memory address, from the first physical memory location (first PML) 534, to a spare physical memory location (spare PML) 536. A spare physical memory location is a location in the OTP NVM to which data has not yet been stored, and which is available to store data. A cloud is used to show that the remapped correspondence need not necessarily be within the remapping unit, or even the MMU, but may merely be accessible to the remapping unit and/or the MMU.

The MMU also has a second interface 528 to the OTP NVM 504. The second interface may allow the updated data to be read from, or written to, the spare physical memory location (spare PML) 536 of the OTP NVM.

In one or more embodiments of the invention, the MMU and/or the remapping unit may be implemented in hardware, such as, for example, an integrated circuit or other circuit. As another option, in one or more embodiments of the invention, the MMU and/or the remapping unit may be implemented in software, such as, for example, instructions stored on a machine-readable medium. As yet another option, in one or more embodiments of the invention, the MMU and/or the remapping unit may be implemented in a combination of both hardware and software.

From the perspective of the component and/or the user, the OTP NVM may appear to be reprogrammable. However the component and/or the user may communicate using the virtual address space and does not need to be aware of the remapping process. Additionally, each spare physical memory location may be remapped individually and potentially one-by-one. As a result, the appearance of re-programmability may be achieved without the need for fully duplicate and/or redundant memory banks. Advantageously, this may help to allow significant size reductions of the OTP NVM in numerous applications.

Figure 6A:
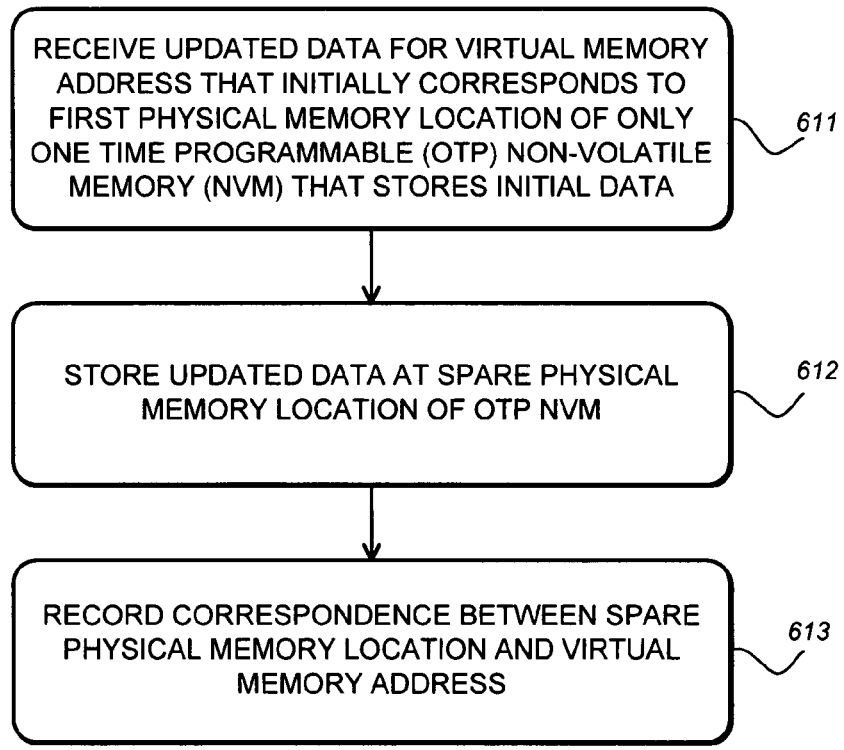
FIG. 6A is a block flow diagram of a method of storing updated data in an only one time programmable (OTP) non-volatile memory (NVM), according to embodiments of the invention.

FIG. 6A is a block flow diagram of a method 610 of storing updated data in an only one time programmable (OTP) non-volatile memory (NVM), according to embodiments of the invention. At block 611, updated data may be received for a virtual memory address. The virtual memory address may initially correspond to a first physical memory location of an only one time programmable (OTP) non-volatile memory (NVM). The first physical memory location may already store initial data.

The updated data may be stored at a spare physical memory location of the OTP NVM, at block 612. A correspondence between the spare physical memory location and the virtual memory address may be recorded, at block 613. The operations of blocks 612 and 613 may also optionally be performed in reverse order. Other operations may also optionally be added to the method.

Such ability to store updated data in the OTP NVM may be useful for a number of reasons. As one example, settings, values, or keys may be recalibrated or otherwise updated in the field. As another example, code patches or updates may be stored. As yet another example, yield enhancements or field repair may be achieved by swapping out defective or failed memory locations in favor of other memory locations. These are just a few illustrative examples.

Figure 6B:
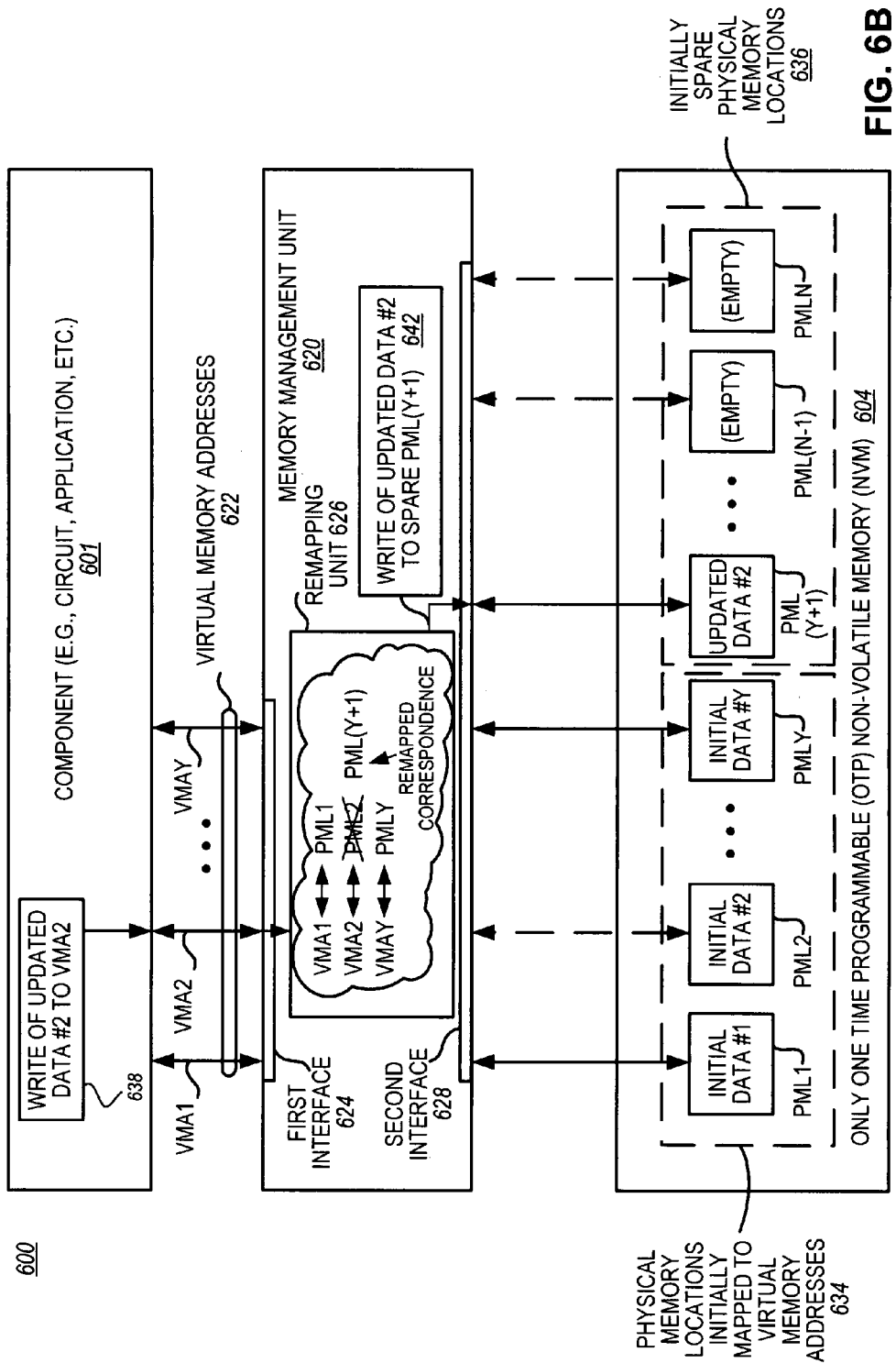
FIG. 6B is a block diagram of a detailed example of a system showing how updated data may be stored in a spare physical memory location of an only one time programmable (OTP) non-volatile memory (NVM), according to embodiments of the invention.

FIG. 6B is a block diagram of a detailed example of a system 600 showing how updated data may be stored in an only one time programmable (OTP) non-volatile memory (NVM) 604, according to embodiments of the invention.

The system includes a component 601, such as, for example, a circuit or software application. The component utilizes a set of virtual memory addresses (VMAs) 622. In the illustration, the set includes VMA1 through VMAY, where Y is an integer.

The system also includes a memory management unit (MMU) 620. The MMU has a first interface 624 to the component. The MMU may communicate with the component through the first interface using the virtual memory addresses (VMAs). The MMU has a remapping unit 626 to remap virtual memory addresses (VMAs) to spare physical memory locations (SPMLs) in the OTP NVM. The SPMLs may be used to store updated or changed data for VMAs. By way of example, each spare physical memory location may include a page having one or more words (e.g., a number of words that is a power of two). The MMU also has a second interface 628 to the OTP NVM. The MMU may communicate with the OTP NVM through the second interface.

As shown, the OTP NVM has a number of physical memory locations (PMLs) labeled as PML1 through PMLN, where N is an integer. The PMLs are divided into a first set 634 and a second set 636.

In the illustration, the first set includes PML1 through PMLY, where Y is the number of virtual memory addresses and is less than N. The first set of PMLs are initially mapped to the virtual memory addresses VMA1 through VMAY. As shown, in one or more embodiments of the invention, the first set of PMLs may each have the same address as a respective one of the virtual memory addresses (VMAs). As further shown, in one or more embodiments, the addresses and may be the sequentially first set of addresses, although this is not required. Each of PML1 through PMLY initially stores a respective set of initial data.

In the illustration, the second set includes PML(Y+1) through PMLN. As shown, in one or more embodiments of the invention, each PML of the second set may have a higher address than the VMAs and PMLs of the first set. Initially, the second set of PMLs are not mapped to the virtual memory addresses and do not store data. That is, initially the second set of PMLs are spare.

As shown at comment 638, the component may write an updated data #2 to VMA2. The MMU may receive the write of the updated data #2 to VMA2. The remapping unit may remap a correspondence of VMA2, from PML2 to initially spare PML(Y+1). As shown at comment 642, the MMU, utilizing the remapping unit, may write the updated data #2 to initially spare PML(Y+1). As shown, the updated data #2 may be stored in PML(Y+1).

This process may be substantially repeated for multiple sets of updated data for one or more corresponding virtual memory addresses. Each of the sets of updated data may be stored in a corresponding spare physical memory location of the OTP NVM. A correspondence between each of the spare physical memory locations and a corresponding virtual memory address may be recorded.

Re-programmability may be achieved as long as un-programmed spare physical memory locations are available. The amount of re-programmability may be adjusted by adjusting the number of initially spare physical memory locations available. Advantageously, in this way, the MMU may provide the appearance to the component that the OTP NVM is multiple times re-programmable without the need for fully duplicative memory banks.

Figure 7:
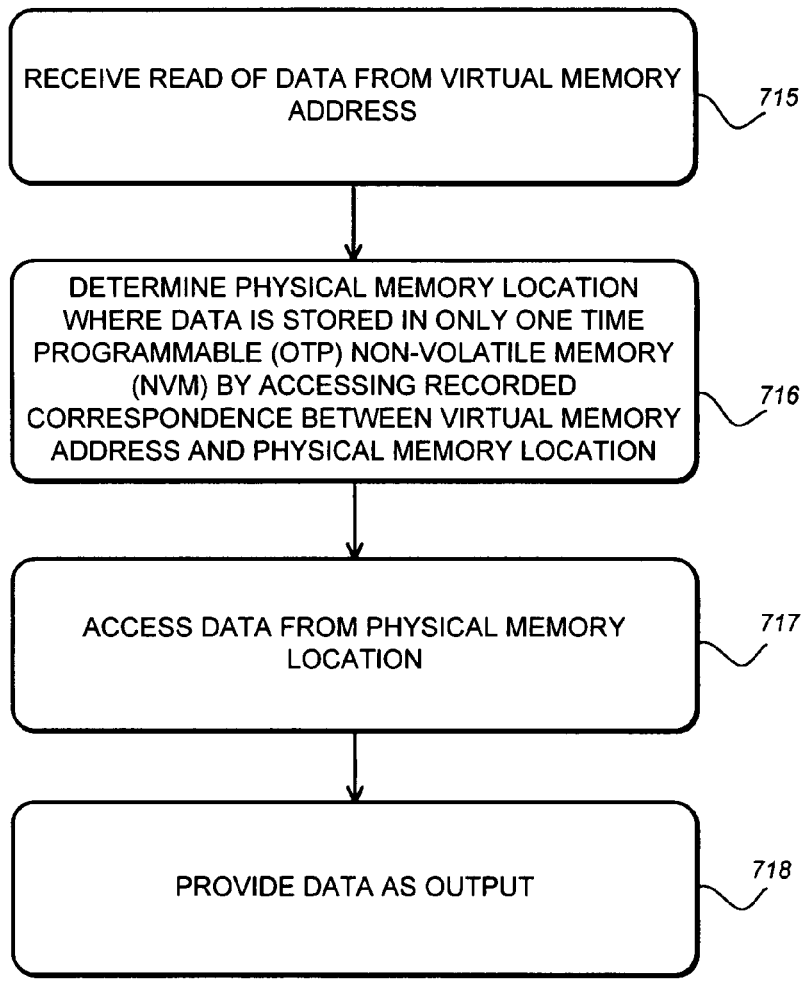
FIG. 7 is a block flow diagram of a method of accessing data from an only one time programmable (OTP) non-volatile memory (NVM), according to embodiments of the invention.

Other aspects of the invention pertain to reading or accessing data from the OTP NVM. FIG. 7 is a block flow diagram of a method 714 of accessing data from an only one time programmable (OTP) non-volatile memory (NVM), according to embodiments of the invention.

At block 715, a read of data from a virtual memory address may be received, such as, for example, from a circuit, application, or other component. Then a physical memory location where the data is stored in the OTP NVM may be determined by accessing a recorded correspondence between the virtual memory address and the physical memory location, at block 716. In embodiments of the invention, the correspondence may be a remapped correspondence, which differs from an initial or default correspondence. At block 717, the data may be accessed from the physical memory location. The data may be provided as output, such as, for example, to the circuit, application, or other component from which the read of the data was received, at block 718.

Figure 8A:
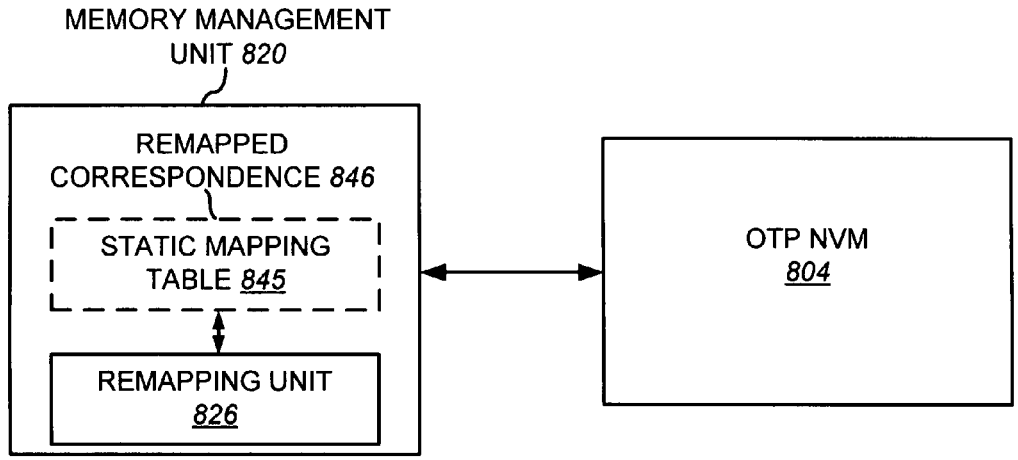
FIG. 8A is a block diagram showing that a remapped correspondence may optionally be stored in and/or accessed from a memory management unit (MMU), according to embodiments of the invention.
Figure 8B:
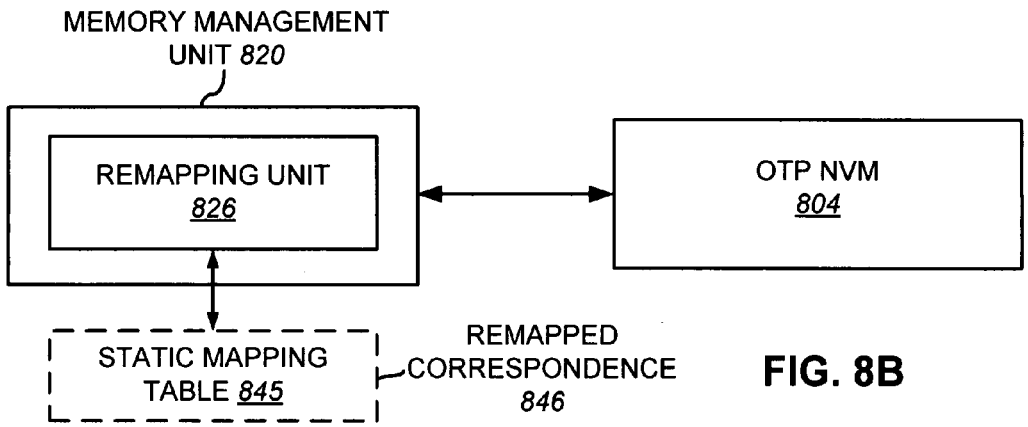
FIG. 8B is a block diagram showing that a remapped correspondence may optionally be stored in and/or accessed from a location outside of both an memory management unit (MMU) and an only one time programmable (OTP) non-volatile memory (NVM), according to embodiments of the invention.
Figure 8C:
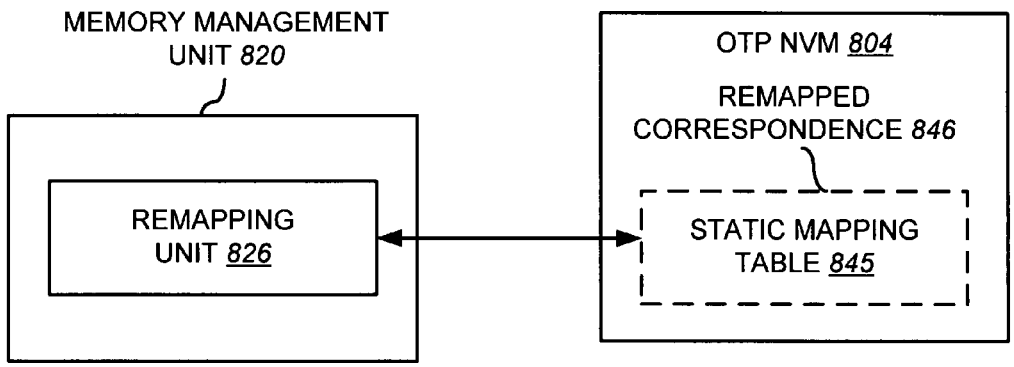
FIG. 8C is a block diagram showing that a remapped correspondence may optionally be stored in and/or accessed from an only one time programmable (OTP) non-volatile memory (NVM), according to embodiments of the invention.

FIGS. 8A-8C are block diagrams showing a memory management unit (MMU) 820 that has a remapping unit 826 that is operable to store and/or access a remapped correspondence 846, such as, for example, in a static mapping table 845, according to embodiments of the invention. In addition, FIGS. 8A-8C show different possible locations for the remapped correspondence, according to various embodiments of the invention.

FIG. 8A shows that a remapped correspondence 846 may optionally be stored in and/or accessed from within an MMU 820, according to embodiments of the invention. By way of example, the MMU may include an integrated circuit having embedded memory, for example an NVM, to store the remapped correspondence. Storing the remapped correspondence in an NVM may help to avoid losing the remapped correspondence in the event of a loss of system power.

FIG. 8B shows that a remapped correspondence 846 may optionally be stored in and/or accessed from a location outside of both an MMU 820 and an OTP NVM 804, according to embodiments of the invention. By way of example, a separate integrated circuit or a main system memory may include a memory, for example a NVM, to store the remapped correspondence.

FIG. 8C shows that a remapped correspondence 846 may optionally be stored in and/or accessed from an OTP NVM 804, according to embodiments of the invention. The OTP NVM is already available, is resilient to loss of system power, and is relatively small.

Figure 9:
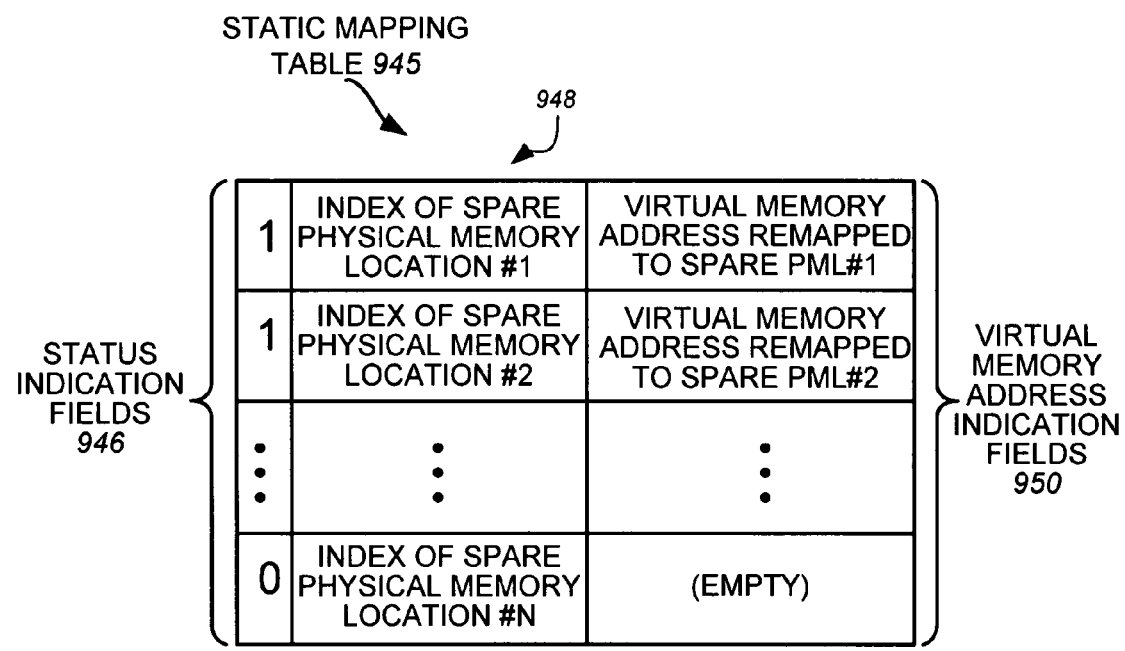
FIG. 9 is a diagram of an example of a static mapping table, according to embodiments of the invention.

FIG. 9 is a diagram of an example of a static mapping table 945, according to embodiments of the invention. The table has three columns.

The second column 948 is a column of indexes of spare physical memory locations. The first row has an index of the spare physical memory location #1, the second row has an index of the spare physical memory location #2, etc. The table has a number of rows equal to a number of initially spare physical memory locations in the OTP NVM, which are available to store data. In this case, that number is N, where N is an integer. The indexes may have enough bits to uniquely identify each of the N spare physical memory locations. By way of example, 3 bits may index 8 spare physical memory locations.

The third column 950 is a column of virtual memory address indication fields. There is a virtual memory address indication field for each of the initially spare physical memory locations of the OTP NVM. The virtual memory address indication fields are initially empty. When a spare physical memory location in a given row is used to store data, the remapping unit is operable to store an indication of a virtual memory address remapped to that spare physical memory location in the corresponding virtual memory address indication field within the given row. The spare physical memory locations may be used in a fixed order, such as, for example, in the order of increasing addresses.

The first column 946 is a column of status indication fields. The status indication fields initially have a first value, for example a bit value of zero, to indicate that the spare physical memory locations within the corresponding rows initially are not used. When a spare physical memory location in a given row is used to store data, the remapping unit is operable to change the status indication field within the given row to a second value, for example bit value of one, to indicate that the corresponding spare physical memory location within the given row has now been used to store data.

The static mapping table may be stored in an overhead space of the OTP NVM. Generally, reducing the amount of overhead space is desirable. One way to reduce the amount of overhead space is to store multiple entries of the static mapping table, each corresponding to a different spare physical memory location, in the same word and/or row of the OTP NVM.

Figure 10:
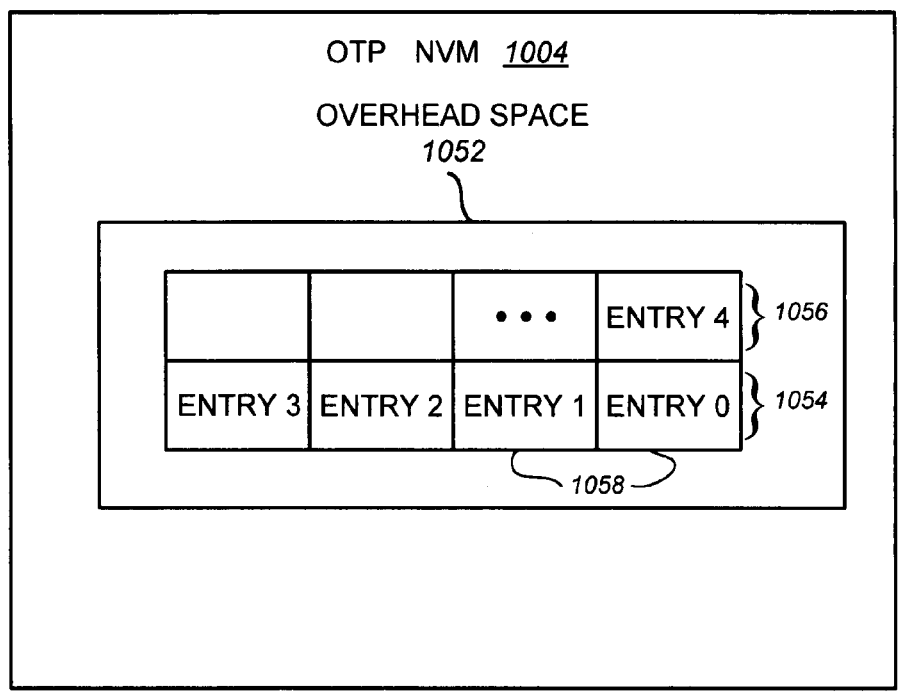
FIG. 10 is a block diagram illustrating that multiple entries of the static mapping table, each corresponding to a different spare physical memory location, may be stored in a common word and/or row of an only one time programmable (OTP) non-volatile memory (NVM), according to embodiments of the invention.

FIG. 10 is a block diagram illustrating that multiple entries of the static mapping table, each corresponding to a different spare physical memory location, may be stored in a common word and/or row of an only one time programmable (OTP) non-volatile memory (NVM), according to embodiments of the invention. The OTP NVM has an overhead space 1052. Within the overhead space are stored entries 1058 of a static mapping table. As shown, multiple entries are stored in each word and/or row of the OTP NVM. In particular, Entry 0 through Entry 3 are stored in a first word and/or row 1054 and entry 4 and other entries are stored in a second word and/or row 1056.

Traditionally, error correction code (ECC) or parity bits are computed for a word and/or row. However, since the OTP NVM may be programmed incrementally, such traditional ECC or parity computation may attempt to compute the ECC or parity on each programming. Instead, in accordance with one or more embodiments of the invention, the MMU may locally compute the ECC or parity bits separately for the different entries and store them into the overhead space along with each respective entry of the static mapping table.

Figure 11:
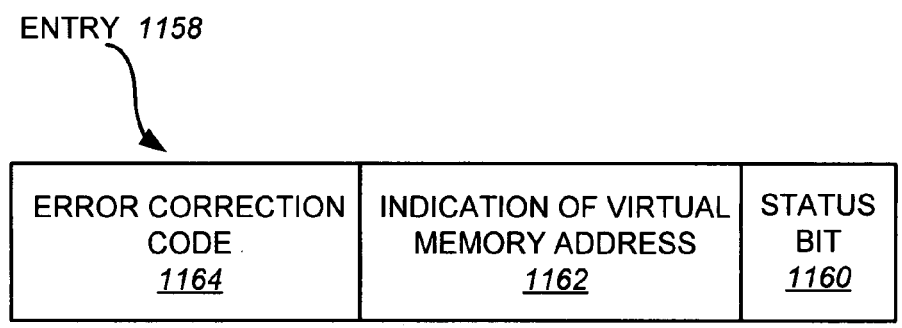
FIG. 11 is a block diagram of an example of a static mapping table entry, according to embodiments of the invention.

FIG. 11 is a block diagram of an example of a static mapping table entry 1158, according to one or more embodiments of the invention. The entry includes a status bit 1160, an indication of a virtual memory address 1162, and error correction code (ECC) 1164. The index of the spare physical memory location corresponding to the entry may be implicit in the order of the entry in the table.

Recall from the discussion of FIG. 8C that the remapped correspondence may optionally be stored in the OTP NVM. One potential drawback is that access times for certain types of OTP NVM may tend to be relatively slow. In embodiments of the invention, the remapped correspondence may optionally be copied from the OTP NVM to a data structure and/or cache having a faster access time than the static mapping table in the OTP NVM.

Figure 12:
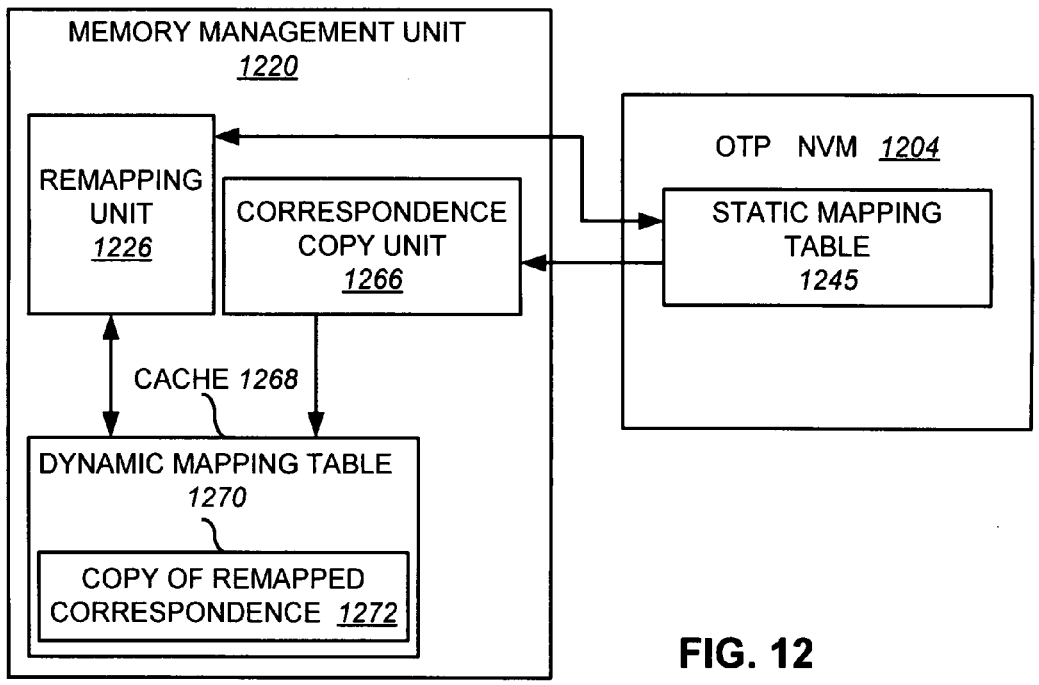
FIG. 12 is a block diagram of a memory management unit (MMU) having a correspondence copy unit that is operable to copy a remapped correspondence from a static mapping table in an only one time programmable (OTP) non-volatile memory (NVM) to a dynamic mapping table in a cache, according to embodiments of the invention.

FIG. 12 is a block diagram of a memory management unit (MMU) 1220 having a correspondence copy unit 1266 that is operable to copy a remapped correspondence from a static mapping table 1245 in an only one time programmable (OTP) non-volatile memory (NVM) 1204 to a dynamic mapping table 1270 in a cache 1268, according to embodiments of the invention.

The correspondence copy unit is electrically coupled with, or otherwise in communication with, the static mapping table. The correspondence copy unit is also electrically coupled with, or otherwise in communication with, the cache. As is known, a cache is a memory location or device to store data duplicating original data stored elsewhere in order to allow for more rapid access of the data. In embodiments of the invention, the cache may include a memory having a faster access speed than the OTP NVM. Examples of suitable memories for the cache include, but are not limited to, an array of latches, an array of registers, a static random access memory (SRAM), a dynamic random access memory (DRAM), and a content addressable memory (CAM). In the illustrated embodiment, the cache includes an embedded cache of the MMU, although this is not required. Optionally, a separate cache may be used instead.

The correspondence copy unit may copy the remapped correspondence from the static mapping table to the dynamic mapping table in the cache. As shown, a copy of the remapped correspondence may be stored in the dynamic mapping table. The format of the remapped correspondence and the copy of the remapped correspondence in the static and dynamic mapping tables, respectively, may potentially differ.

The MMU also includes a remapping unit 1226. As previously discussed, the remapping unit may originally store a remapped correspondence in the static mapping table in the OTP NVM. The remapping unit is also electrically coupled with, or otherwise in communication with, the dynamic mapping table. The remapping unit may access the copy of the remapped correspondence from the dynamic mapping table. The faster access time of the cache and/or the dynamic mapping table may help to allow for faster read and/or write operations.

Figure 13:
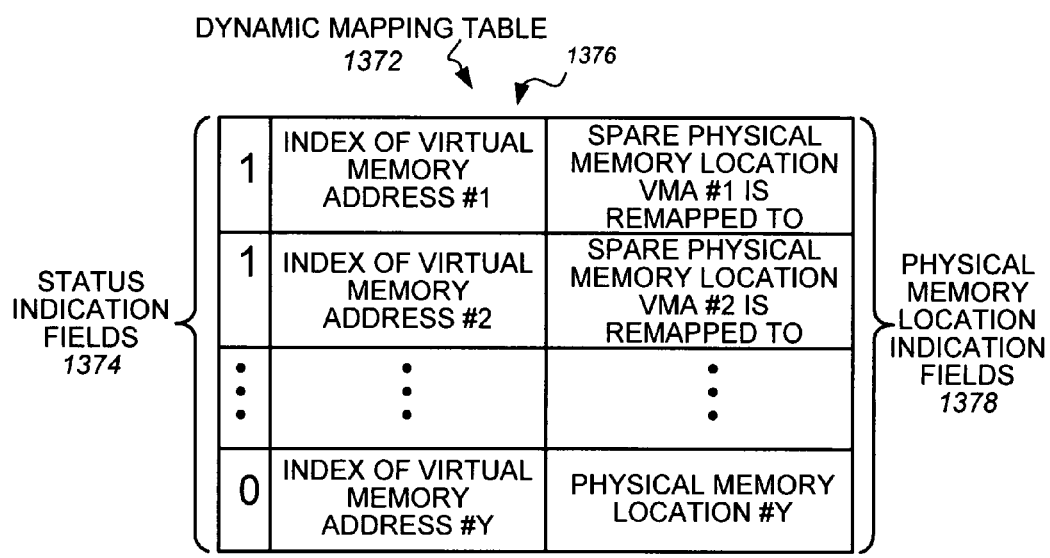
FIG. 13 is a diagram of an example of a dynamic mapping table, according to embodiments of the invention.

FIG. 13 is a diagram of an example of a dynamic mapping table 1372, according to embodiments of the invention. The dynamic mapping table represents much of the same information about the correspondences between the virtual memory addresses and the spare physical memory locations from static mapping table but in a rearranged format.

The table has three columns. The second column 1376 is a column of indexes of the virtual memory addresses. The first row has an index of the virtual memory address #1, the second row has an index of the virtual memory address #2, etc. The table has a number of rows equal to a number of virtual memory addresses. In this case, that number is Y, where Y is an integer.

The third column 1378 is a column of physical memory location indication fields. There is a physical memory location indication field for each of the corresponding virtual memory addresses (i.e., rows). In one or more embodiments of the invention, the physical memory location indication fields initially indicate a physical memory location with the same address as the virtual memory address within the same row. For example, as shown physical memory location #Y is initially indicated for virtual memory address #Y. When a virtual memory address in a given row is remapped to a spare physical memory location, the remapping unit is operable to store an indication of the spare physical memory location in the physical memory location indication field within the given row.

The first column 1374 is a column of status indication fields. The status indication fields initially have a first value, for example a bit value of zero, to indicate that the virtual memory address within the corresponding rows initially have not been remapped to a spare physical memory location (i.e., they still correspond to the initial physical memory locations). When a virtual memory address in a given row is remapped to a spare physical memory location, the remapping unit is operable to change the status indication field within the given row to a second value, for example bit value of one, to indicate that the virtual memory address within the given row has now been remapped.

The remapping unit may be operable to update the dynamic mapping table with the static mapping table when appropriate. By way of example, this updating may be performed at reset, during reinitialization, when remapped correspondences change, periodically, upon request, or at a combination of such times.

In one or more embodiments of the invention, the MMU may allow a user, component, or other entity to designate one or more virtual memory addresses as OTP only. The remapping unit is not permitted to remap a virtual memory address that is designated as OTP only from its initially corresponding physical memory location to a spare physical memory location. In other words, updated data may not be written to a virtual memory address that is designated as OTP only. One potential advantage of the ability to designate one or more virtual memory addresses as OTP only is the ability to essentially "lock" certain data to prevent it from being rewritten. Furthermore, designating one or more virtual memory addresses as OTP only may help to reduce the size or overhead of preserving remapped correspondences. Different ways of designating a virtual memory address as OTP only are possible, such as, for example, storing a bit having a particular value, such as, for example a binary value of one, in a dynamic mapping table, for a particular virtual memory address.

Figure 14:
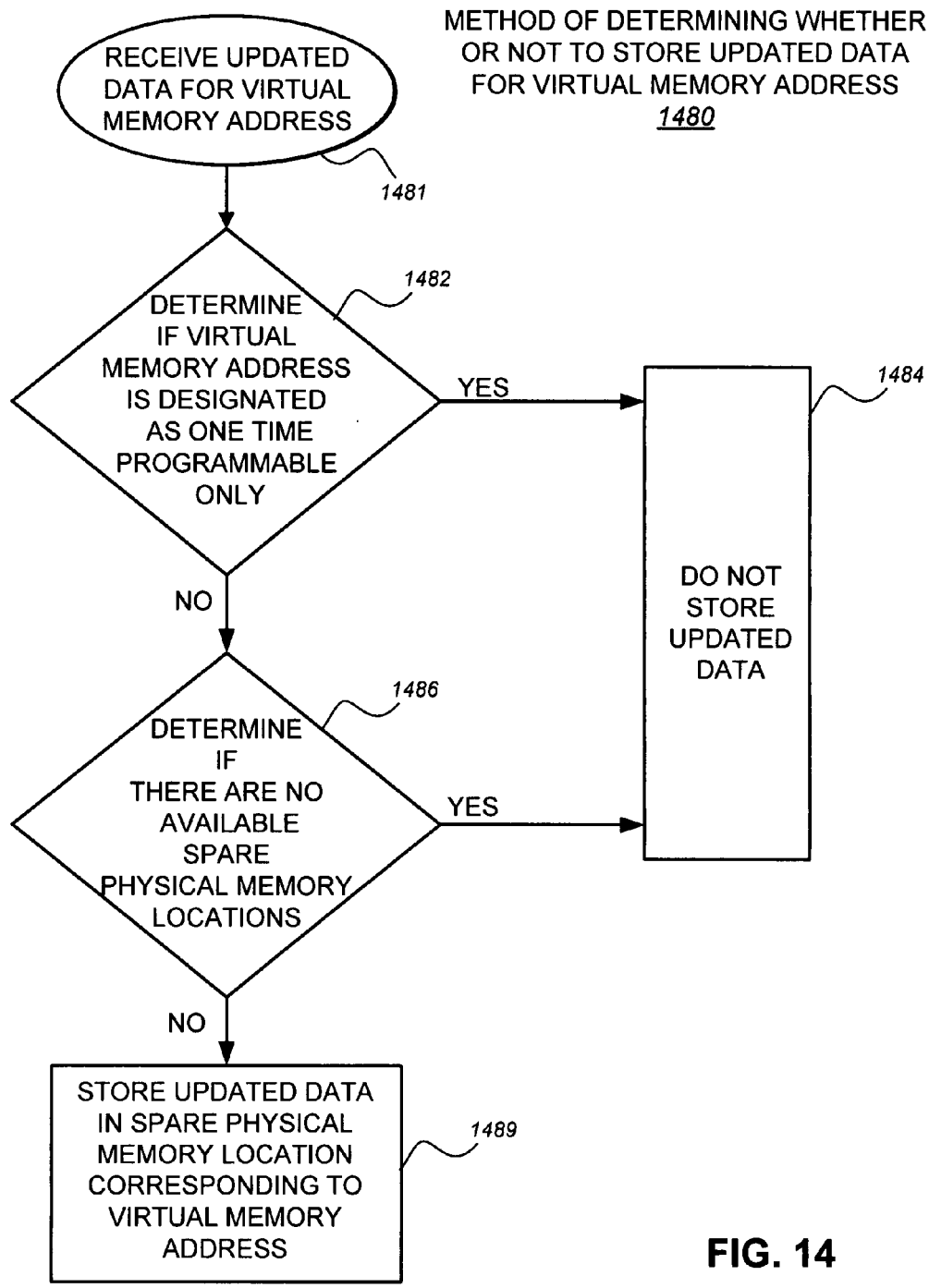
FIG. 14 is a block flow diagram of a method of determining whether or not to store updated data for a virtual memory address, according to embodiments of the invention.

FIG. 14 is a block flow diagram of a method 1480 of determining whether or not to store updated data for a virtual memory address, according to embodiments of the invention. At block 1481, updated data may be received for a virtual memory address.

Then, a determination may be made whether the virtual memory address is designated as one time programmable (OTP) only, at block 1482. By way of example, an OTP only indication field corresponding to the virtual memory address in a given row of a dynamic mapping table may be checked to see if it has a particular value, for example binary one, to indicate that the virtual memory address is designated as OTP only.

If the virtual memory address is designated as OTP only (i.e., "yes" is the determination at block 1482), then the method may advance to block 1484. At block 1484, the updated data may not be stored.

Alternatively, if the virtual memory address is not designated as OTP only (i.e., "no" is the determination at block 1482), then the method may advance to determination block 1486. At block 1486, another determination may be made if there are no available spare physical memory locations.

If there are no spare physical memory locations (i.e., "yes" is the determination at block 1486), then the method may advance to block 1484. At block 1484, storing the updated data may be omitted. In general, re-programmability is only possible so long as additional spare physical memory locations remain.

Alternatively, if there are spare physical memory locations (i.e., "no" is the determination at block 1486), then the method may advance to block 1489. At block 1489, the virtual memory address may be remapped to a spare physical memory location, and the updated data may be stored in the spare physical memory location corresponding to the virtual memory address.

Figure 15:
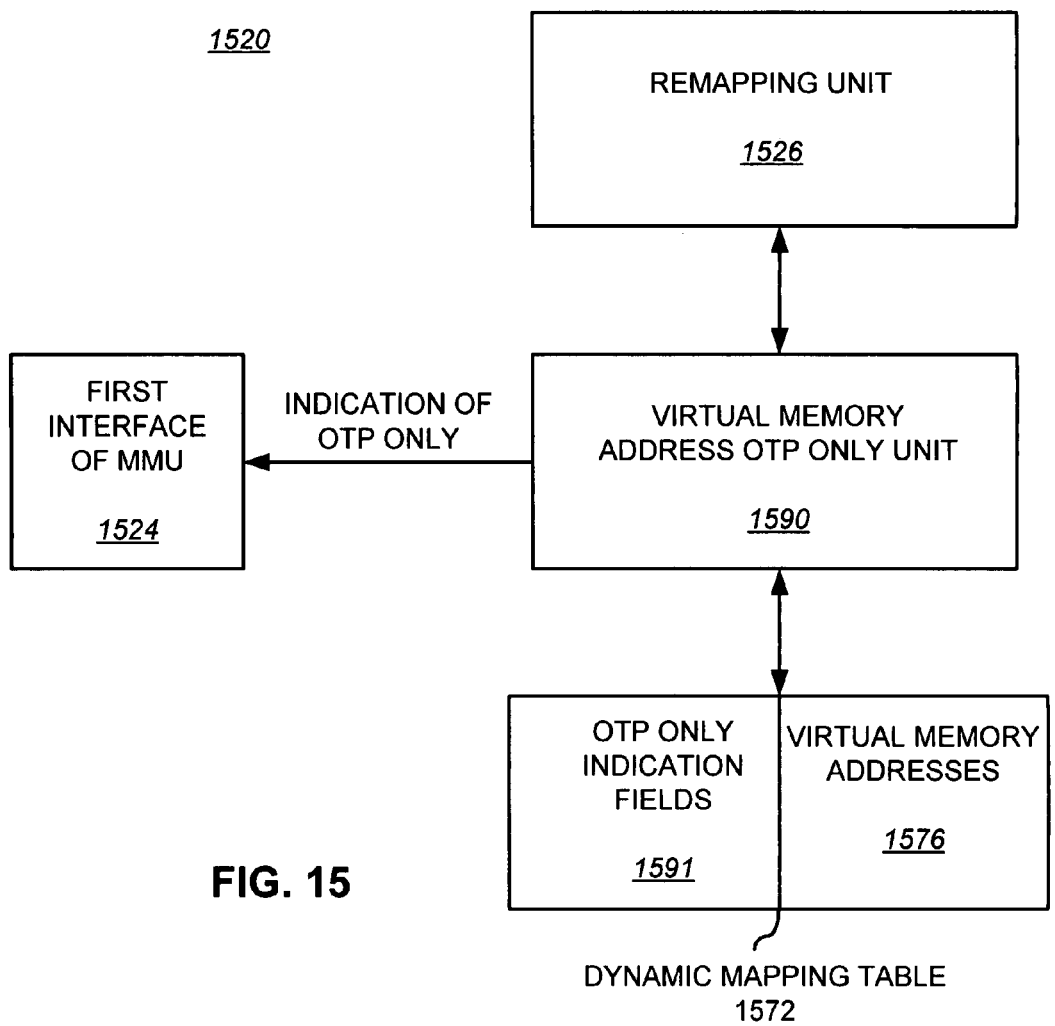
FIG. 15 is a block diagram of a memory management unit (MMU) having a virtual memory address one time programmable (OTP) only unit to access OTP only indication fields, according to embodiments of the invention.

FIG. 15 is a block diagram of a memory management unit (MMU) 1520 having a virtual memory address one time programmable (OTP) only unit 1590 to access OTP only indication fields 1591, according to embodiments of the invention. The virtual memory address OTP only unit is electrically coupled with, or otherwise in communication with, the OTP only indication fields. As shown, in one or more embodiments, the OTP only indication fields may be stored in a dynamic mapping table 1572 along with their corresponding virtual memory addresses 1576. Alternatively, a separate table or other data structure may optionally be used to store the OTP only indication fields.

The virtual memory address OTP only unit may use the fields to allow one or more virtual memory addresses to be designated as OTP only. The virtual memory address OTP only unit is in communication with a first interface 1524 of the MMU. A component may indicate to the virtual memory address OTP only unit and/or the MMU that a given virtual memory address is to be designated as OTP only. In response to the indication, the virtual memory address OTP only unit may access an OTP only indication field corresponding to the given virtual memory address, and may change a value of the field to a value that indicates that the virtual memory address is designated as OTP only.

A remapping unit 1526 is electrically coupled with, or otherwise in communication with, the virtual memory address OTP only unit. Prior to allowing updated data to be written to a virtual memory address and/or prior to allowing a virtual memory address to be remapped to a spare physical memory location, the remapping unit may use the virtual memory address OTP only unit to access the OTP only indication fields to determine whether a given virtual memory address is designated as OTP only.

As shown, if the given virtual memory address is designated as OTP only, the virtual memory address OTP only unit may, in some cases, optionally provide an indication to the component through the first interface that the given virtual address is designated as OTP only. For example, a pin may be asserted.

Figure 16:
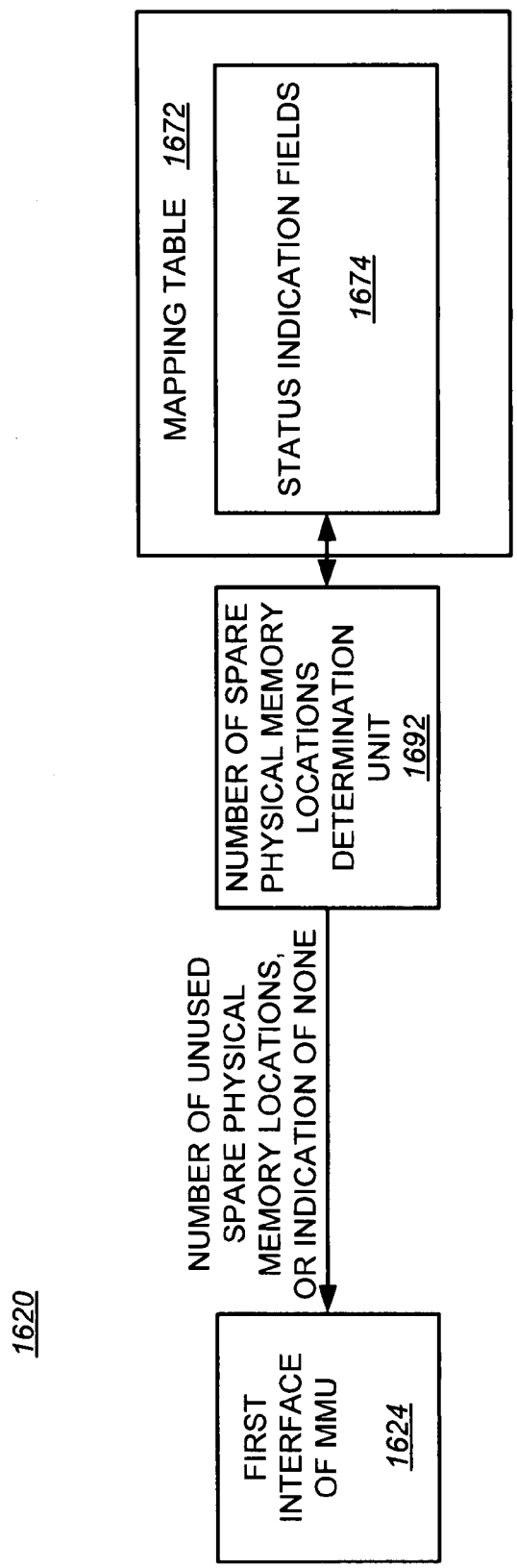
FIG. 16 is a block diagram of a memory management unit (MMU) having a number of spare physical memory locations determination unit provide as output a number of unused spare physical memory locations, or an indication that there are none, according to embodiments of the invention.

FIG. 16 is a block diagram of a memory management unit (MMU) 1620 having a number of spare physical memory locations determination unit 1692 to provide as output a number of unused spare physical memory locations, or an indication that there are none, according to embodiments of the invention. The determination unit is electrically coupled with, or otherwise in communication with, status indication fields. As shown, in one or more embodiments, status indication fields may be stored in a mapping table 1672, for example a static mapping table. Alternatively, a separate table or other data structure may optionally be used to store the status indication fields.

The determination unit 1692 may access the status indication fields and use the status indication fields to count the number of unused spare physical memory locations. For example, the determination unit may count the number of status indication fields having a first value, for example binary zero, to indicate that the corresponding spare physical memory locations have not yet been used to store data. Other approaches for determining the number of unused spare physical memory locations are also possible. For example, a counter representing the number of unused spare physical memory locations may be decremented each time a spare physical memory location is used, such that the current value of the counter represents the number of remaining unused spare physical memory locations.

As shown, the determination unit is electrically coupled with, or otherwise in communication with, the first interface 1624 of the MMU. The determination unit may be operable to provide as output the number of unused spare physical memory addresses, or an indication that there are none. By way of example, the output may be provided on a pin.

The electrical circuit(s) described in this document can be manufactured in any number of ways, as will be appreciated by the persons skilled in the art. One such way is as integrated circuit(s), as described below.

Schematic-type inputs can be provided for the purpose of preparing one or more layouts. These inputs can include as little as a schematic of a circuit, to more including relative sizes of circuit components and the like, as will be appreciated by a person skilled in the art for such inputs. These inputs can be provided in any suitable way, such as merely in writing, or electronically, as computer files and the like. One or more embodiments of the invention may be provided as register transfer level (RTL) code. Some of these computer files can be prepared with the assistance of suitable design tools, often provided as computer software. Such tools often include instrumentalities for simulating circuit behaviors and the like.

These inputs can be provided to a person skilled in the art of preparing layouts. This, whether the person is within the same company, or another company, such as under a contract.

A layout can be prepared that embodies the provided schematic-type inputs by the person skilled in the art. The layout is itself preferably prepared as a computer file. It may be additionally checked for errors, modified as needed, and so on.

In the above, computer files can be made from portions of computer files. For example, suitable individual designs can be assembled for the electrical components and circuits indicated in the schematic-type inputs. The individual designs can be generated anew, or selected from existing libraries for such items. In the layout phase, the assembled designs can be arranged to interoperate, so as to implement as integrated circuit(s) the electrical circuit(s) of the provided schematic-type inputs. These computer files can be stored in storage media, such as memories, whether portable or not, and the like.

Then a special type of computer file can be synthesized from the prepared layout, in a manner that incorporates the prepared layout that has the embodied schematic-type inputs. Such files are known in the industry as IC chip design files or tapeout files, and express instructions for machinery as to how to process a semiconductor wafer, so as to generate an integrated circuit that is arranged as in the incorporated layout. These IC chip design files or tapeout files can be stored on an article such as a memory device.

The synthesized tapeout file is then transferred to a semiconductor manufacturing plant, which is also known as a foundry, and so on. Transferring can be by any suitable means, such as over an electronic network. Or a tapeout file can be recorded in a storage medium, which in turn is physically shipped to the mask manufacturer.

The received tapeout file is then used by mask making machinery as instructions for processing a semiconductor wafer. The wafer, as thus processed, now has one or more integrated circuits, each made according to the layout incorporated in the tapeout file. If more than one, then the wafer can be diced to separate them, and so on.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

In the description above, for the purposes of explanation, numerous specific details have been set forth in order to provide a thorough understanding of the embodiments of the invention. It will be apparent however, to one skilled in the art, that one or more other embodiments may be practiced without some of these specific details. The particular embodiments described are not provided to limit the invention but to illustrate it. The scope of the invention is not to be determined by the specific examples provided above but only by the claims below. In other instances, well-known circuits, structures, devices, and operations have been shown in block diagram form or without detail in order to avoid obscuring the understanding of the description. Where considered appropriate, reference numerals or terminal portions of reference numerals have been repeated among the figures to indicate corresponding or analogous elements, which may optionally have similar characteristics.

Modifications may be made to the embodiments disclosed herein, such as, for example, to the sizes, shapes, configurations, arrangements, forms, functions, and manner of operation, and use, of the components of the embodiments. All equivalent relationships to those illustrated in the drawings and described in the specification are encompassed within embodiments of the invention.

Various operations and methods have been described. Some of the methods have been described in a basic form, but operations may optionally be added to and/or removed from the methods. Certain operations of the methods may also often optionally be performed in different order. Many modifications and adaptations may be made to the methods and are contemplated.

Certain operations may be performed by hardware components, or may be embodied in machine-executable instructions, that may be used to cause, or at least result in, a circuit programmed with the instructions performing the operations. The circuit may include a general-purpose or special-purpose processor, or logic circuit, to name just a few examples. The operations may also optionally be performed by a combination of hardware and software.

One or more embodiments of the invention may be provided as a program product or other article of manufacture that may include a machine-accessible and/or readable medium having stored thereon one or more instructions, data structures, and/or electronic design automation files. The medium may provide instructions, which, if executed by a machine, may result in and/or cause the machine to perform one or more of the operations or methods disclosed herein. Suitable machines include, but are not limited to, memory management units, remapping units, and various systems in which the memory management units and/or remapping units may be utilized.

The medium may include a mechanism that stores information in a form that is accessible by the machine. For example, the medium may optionally include recordable and/or non-recordable mediums, such as, for example, floppy diskette, optical storage medium, optical disk, CD-ROM, magnetic disk, magneto-optical disk, read only memory (ROM), programmable ROM (PROM), erasable-and-programmable ROM (EPROM), electrically-erasable-and-programmable ROM (EEPROM), random access memory (RAM), static-RAM (SRAM), dynamic-RAM (DRAM), Flash memory, and combinations thereof.

For clarity, in the claims, any element that does not explicitly state "means for" performing a specified function, or "step for" performing a specified function, is not to be interpreted as a "means" or "step" clause as specified in 35 U.S.C. Section 112, Paragraph 6. In particular, any potential use of "step of" in the claims herein is not intended to invoke the provisions of 35 U.S.C. Section 112, Paragraph 6.

It should also be appreciated that reference throughout this specification to "one embodiment", "an embodiment", or "one or more embodiments", for example, means that a particular feature may be included in the practice of the invention. Similarly, it should be appreciated that in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects may lie in less than all features of a single disclosed embodiment. Thus, the claims following the Detailed Description are hereby expressly incorporated into this Detailed Description, with each claim standing on its own as a separate embodiment of the invention.

What is claimed is:

1. A memory management unit comprising:

a first interface configured to receive a command to write updated data to a virtual memory address corresponding to a physical memory location in an one time programmable (OTP) non-volatile memory (NVM), the physical memory location storing initial data;

a remapping unit coupled to the first interface and configured to:

determine whether the physical memory location is designated as remappable responsive to receiving the command, wherein the size of the physical memory location is smaller than the OTP NVM, remap a correspondence of the virtual memory address from the physical memory location to another physical memory location in the OTP NVM by remapping the virtual memory address from the physical memory location to the other physical memory location, responsive to determining that the physical memory location is remappable, and prevent remapping of the virtual memory address responsive to determining that the physical memory location is designated as not being remappable, wherein the other physical memory location is configured to store one or more words and has a size smaller than the OTP NVM; and a second interface between the OTP NVM and the remapping unit, the second interface configured to write the updated data to the other physical memory location of the OTP NVM.

2. The memory management unit of claim 1, wherein a static mapping table for storing the correspondence of the virtual memory address and the physical memory location or the other physical memory location is located in a NVM.

3. The memory management unit of claim 2, wherein the static mapping table is located in the OTP NVM.

4. The memory management unit of claim 3, wherein the remapping unit is operable to store the remapped correspondence in the static mapping table of the OTP NVM, and wherein the remapping unit is operable to store an indication of the virtual memory address at a virtual memory address indication field of the static mapping table that corresponds to the other physical memory location.

5. The memory management unit of claim 4, wherein the remapping unit is operable to store the indication of the virtual memory address in a common row of the OTP NVM storing another indication of another virtual memory address.

6. The memory management unit of claim 5, wherein the remapping unit is operable to store error correction codes for the indication in the common row.

7. The memory management unit of claim 6, wherein each of the generated error correction codes is stored in overhead space along with each entry of the static mapping table.

8. The memory management unit of claim 1, wherein a correspondence copy unit is operable to store the remapped correspondence in a dynamic mapping table of a cache that includes a physical memory location indication field for each of a plurality of virtual memory addresses, and in which the correspondence copy unit is operable to store an indication of the other physical memory location at a physical memory location indication field that corresponds to the virtual memory address.

9. The memory management unit of claim 1, further comprising:
a virtual memory address OTP unit in communication with the remapping unit, the virtual memory address OTP unit allowing one or more virtual memory addresses to be designated as OTP.

10. The memory management unit of claim 9, wherein the virtual memory address OTP unit is in communication with the first interface to provide an indication that a virtual address associated with the command is designated as not being remappable.

11. The memory management unit of claim 1, further comprising:
a number of spare physical memory locations determination unit to determine a number of physical memory locations in the OTP NVM that are not programmed with data.

12. The memory management unit of claim 11, wherein the number of spare physical memory locations determination unit is in communication with the first interface and is operable to provide one or more of the number as output and an indication responsive to determining that no physical memory locations is programmed with data.

13. The memory management unit of claim 1, wherein the virtual memory address points to the physical memory location, and the other physical memory location has a higher address than the physical memory location.

14. A method comprising:
storing initial data in a physical memory location;
receiving a command to write updated data for a virtual memory address that corresponds to the physical memory location of a one time programmable (OTP) non-volatile memory (NVM);
determining whether the physical memory location is designated as remappable responsive to receiving the command, wherein the size of the physical memory location is smaller than the OTP NVM;
remapping a correspondence of the virtual memory address from the physical memory location to another physical memory location in the OTP NVM by remapping the virtual memory address from the physical memory location to the other physical memory location responsive to determining that the physical memory location is remappable, wherein the other physical memory location is configured to store one or more words and has a size smaller than the OTP NVM;
storing the updated data at the other physical memory location responsive to determining that the physical memory location is remappable; and
preventing remapping of the virtual memory address responsive to determining that the physical memory location is designated as not being remappable.

15. The method of claim 14, wherein the correspondence of the virtual memory address and the physical memory location or the other physical memory location is stored in a static mapping table.

16. The method of claim 15, wherein the static mapping table is located in the OTP NVM.

17. The method of claim 15, further comprising:
updating the static mapping table to indicate the correspondence between the other physical memory location and the virtual memory address.

18. The method of claim 15, wherein remapping the correspondence comprises storing a first indication of the virtual memory address in the static mapping table of the OTP NVM at a virtual memory address indication field that corresponds to the other physical memory location.

19. The method of claim 18, wherein remapping the correspondence comprises storing the first indication of the virtual memory address in a common row of the OTP NVM along with a second indication of another virtual memory address.

20. The method of claim 19, further comprising:
generating error correction codes for the first indication and the second indication; and
storing the error correction codes along with the first and second indications in the row.

21. The method of claim 20, wherein each of the generated error correction codes is stored in overhead space along with each entry of the static mapping table.

22. The method of claim 18, further comprising:
determining the virtual memory address corresponding to the other physical memory location by indexing into the static mapping table with an index corresponding to the other physical memory location and locating a value indicating the virtual memory address.

23. The method of claim 18, further comprising:
storing one or more bits in the static mapping table to indicate that the other physical memory location has been used to store the updated data.

24. The method of claim 14, further comprising:
determining a number of physical memory locations not used to store data.

25. The method of claim 24, further comprising:
providing the number of the physical memory locations not used to store data as output.

26. The method of claim 14, wherein the physical memory location has a same physical address as the virtual memory address.

27. A non-transitory machine-readable storage medium configured to store instructions executable by mask making machinery, the instructions when executed cause the mask making machinery to:
generate a first interface configured to receive a command to write updated data to a virtual memory address corresponding to a physical memory location in an one time programmable (OTP) non-volatile memory (NVM), the physical memory location storing initial data;
generate a remapping unit coupled to the first interface and configured to:
determine whether the physical memory location is designated as remappable responsive to receiving the command, wherein the size of the physical memory location is smaller than the OTP NVM;
remap a correspondence of the virtual memory address from the physical memory location to another physical memory location in the OTP NVM by remapping the virtual memory address from the physical memory location to the other physical memory location responsive to determining that the physical memory location is remappable, and
prevent remapping responsive to determining that the physical memory location is designated as not being remappable, wherein the other physical memory location is configured to store one or more words and has a size smaller than the OTP NVM; and
generate a second interface between the OTP NVM and the remapping unit, the second interface configured to write to the other physical memory location of the OTP NVM.

28. The storage medium of claim 27, wherein the remapping unit is operable to store the remapped correspondence in the OTP NVM.

* * * * *